US012487555B2

(12) United States Patent
Iwasa et al.

(10) Patent No.: US 12,487,555 B2
(45) Date of Patent: Dec. 2, 2025

(54) RECYCLING METHOD OF RECYCLING DEVELOPING CARTRIDGE THAT INCLUDES COVER MOUNTING STEP, AND JIG MOUNTING STEP PERFORMED BEFORE COVER MOUNTING STEP

(71) Applicant: BROTHER KOGYO KABUSHIKI KAISHA, Nagoya (JP)

(72) Inventors: Go Iwasa, Nagoya (JP); Shuhei Hatano, Komaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/786,202

(22) Filed: Jul. 26, 2024

(65) Prior Publication Data

US 2024/0385569 A1 Nov. 21, 2024

Related U.S. Application Data

(63) Continuation of application No. PCT/JP2023/002042, filed on Jan. 24, 2023.

(30) Foreign Application Priority Data

Jan. 31, 2022 (JP) ................................ 2022-013017

(51) Int. Cl.
*G03G 21/16* (2006.01)
*G03G 21/18* (2006.01)

(52) U.S. Cl.
CPC ....... *G03G 21/181* (2013.01); *G03G 21/1814* (2013.01)

(58) Field of Classification Search
CPC .. G03G 15/08; G03G 15/0894; G03G 21/181; G03G 21/1814; G03G 2215/00987
See application file for complete search history.

(56) References Cited

U.S. PATENT DOCUMENTS 6,246,848 B1 * 6/2001 Morinaga .......... G03G 15/0875 399/119
2011/0020014 A1 * 1/2011 Okamoto ........... G03G 15/0855 399/258
(Continued)

FOREIGN PATENT DOCUMENTS

JP 2006-330351 A 12/2006
JP 2008-191401 A 8/2008
(Continued)

OTHER PUBLICATIONS

International Search Report issued in corresponding PCT /JP2023/002042, Mar. 28, 2023.
(Continued)

*Primary Examiner* — Hoang X Ngo
(74) *Attorney, Agent, or Firm* — Merchant & Gould P.C.

(57) ABSTRACT

A recycling method of recycling a developing cartridge attachable to and detachable from a drum cartridge including a photosensitive drum is provided. The developing cartridge includes: a developing roller; a housing having a filling port; a lever; and a lever cover covering parts of the lever and the filling port. The recycling method includes: a jig mounting step of mounting a jig on both the housing and the lever; a cover removing step of removing the lever cover from the housing; a filling step of filling the housing with developer through the filling port after the cover removing step; a cover mounting step of mounting the lever cover on the housing after the filling step; and a jig removing step of removing the jig from the housing and the lever after the cover mounting step. The jig mounting step is performed before the cover mounting step at the latest.

11 Claims, 15 Drawing Sheets

(56) References Cited

U.S. PATENT DOCUMENTS

| | | | | |
|---|---|---|---|---|
| 2020/0310291 | A1 | 10/2020 | Itabashi | |
| 2023/0400793 | A1 * | 12/2023 | Nguyen | ............. G03G 15/0875 |

FOREIGN PATENT DOCUMENTS

| | | | |
|---|---|---|---|
| JP | 2011-027823 | A | 2/2011 |
| JP | 2014-16498 | A | 1/2014 |
| JP | 2021-117386 | A | 8/2021 |

OTHER PUBLICATIONS

International Preliminary Report on Patentability issued in corresponding International Patent Application No. PCT/JP2023/002042, Aug. 6, 2024.

* cited by examiner

RECYCLING METHOD OF RECYCLING DEVELOPING CARTRIDGE THAT INCLUDES COVER MOUNTING STEP, AND JIG MOUNTING STEP PERFORMED BEFORE COVER MOUNTING STEP

REFERENCE TO RELATED APPLICATIONS

This is a by-pass continuation application of International Application No. PCT/JP2023/002042 filed on Jan. 24, 2023 which claims priority from Japanese Patent Application No. 2022-013017 filed on Jan. 31, 2022. The entire contents of the International Application and the priority application are incorporated herein by reference.

BACKGROUND ART

There has been conventionally known an electro-photographic type image forming apparatus such as a laser printer or an LED printer. With the image forming apparatus, developing cartridges are used. Such developing cartridge includes a lever that is movable relative to a housing.

SUMMARY

The housing of the developing cartridge has a filling port for filling the housing with developer, and includes a cap that covers the filling port. When recycling the developing cartridge, the cap is first removed from the housing. Next, the developer remaining inside the housing is sucked out and the housing is filled with new developer. Subsequently, the cap is mounted on the housing.

When the conventional developing cartridge includes the lever that is movable relative to the housing, a lever cover is needed for holding the lever on the housing. Also, it is conceivable that the lever cover covers the cap in order to prevent the cap from being inadvertently removed from the housing.

In a case where the lever cover has a configuration for covering the cap, the lever cover must be removed when recycling the developing cartridge. However, the lever is no longer held on the housing when the lever cover is removed. Moreover, when remounting the lever cover on the housing, the lever cover needs to be mounted in a state where the lever is held on an outer surface of the housing.

In view of the foregoing, it is an object of the present disclosure to provide a recycling method of recycling a developing cartridge that enables a lever cover to be mounted on a housing while the lever is held on an outer surface of the housing.

In order to attain the above and other object, the present disclosure provides a recycling method of recycling a developing cartridge attachable to and detachable from a drum cartridge including a photosensitive drum. The developing cartridge includes: a developing roller; a housing; a lever; and a lever cover. The developing roller is rotatable about a first axis extending in a first direction. The housing is configured to accommodate developer therein. The housing has a filling port positioned at one end portion in the first direction of the housing. The lever is positioned at the one end portion in the first direction of the housing. In a state where the developing cartridge is attached to the drum cartridge, the lever is pivotally movable relative to the housing about a second axis extending in the first direction between: a first position in which the lever causes the developing roller to contact the photosensitive drum; and a second position in which the lever causes the developing roller to separate from the photosensitive drum. The lever cover is positioned at the one end portion in the first direction of the housing. The lever cover covers a part of the lever and at least a part of the filling port. The recycling method includes: a jig mounting step of mounting a jig on both the housing and the lever to restrict movement of the lever relative to the housing; a cover removing step of removing the lever cover from the housing; a filling step of filling the housing with developer through the filling port after the cover removing step; a cover mounting step of mounting the lever cover on the housing after the filling step; and a jig removing step of removing the jig from the housing and the lever after the cover mounting step. The jig mounting step is performed before the cover mounting step at the latest.

In the above structure, the lever cover is mounted on the casing in a state where the lever is held on the casing through the jig. Accordingly, the lever cover can be mounted on the casing while the lever is held on the one end portion in the first direction of the casing.

DESCRIPTION

Hereinafter, embodiments of the present disclosure will be described while referring to the accompanying drawings.

In the following description, a direction in which a developing roller 30 extends will be referred to as "first direction." Further, a direction in which one end portion of a casing 10 at which the developing roller 30 is positioned and another end portion of the casing 10 are arranged will be referred to as "second direction." The first direction and the second direction cross each other. Preferably, the first direction and the second direction are orthogonal to each other.

1. Configuration of Developing Cartridge

Figure 1:
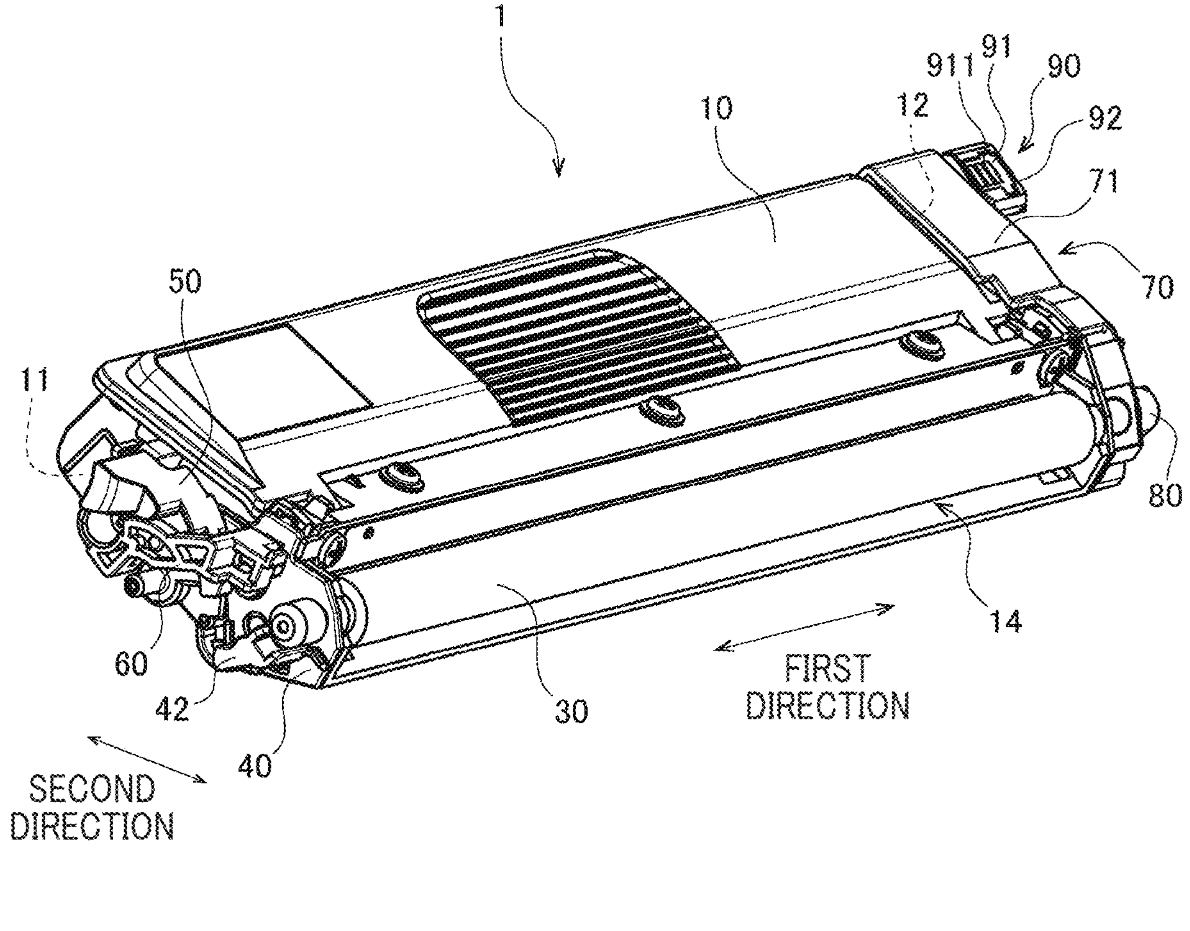
FIG. 1 is a perspective view of a developing cartridge.
Figure 2:
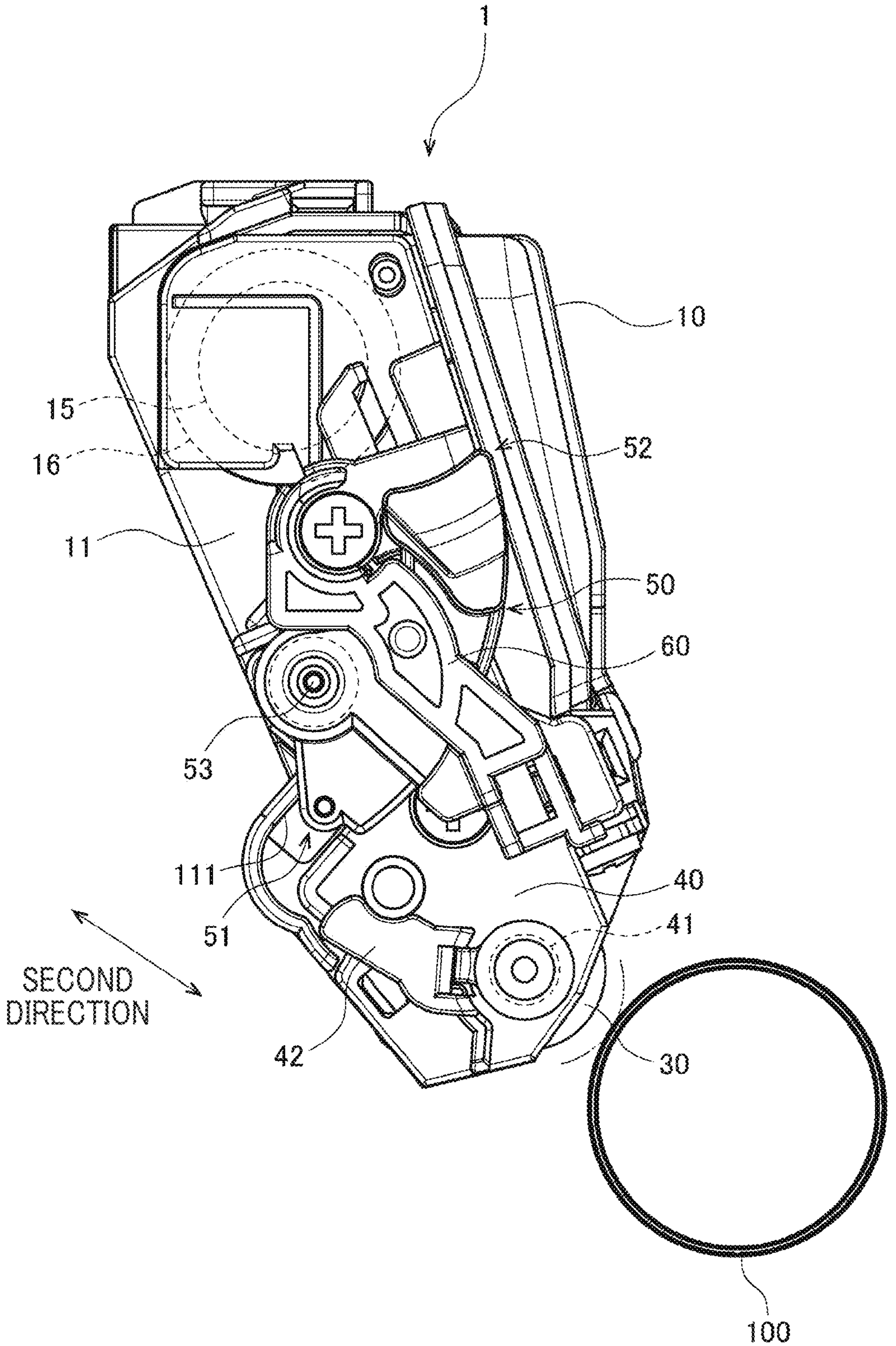
FIG. 2 is a view of the developing cartridge as viewed from a side of a first outer surface.
Figure 3:
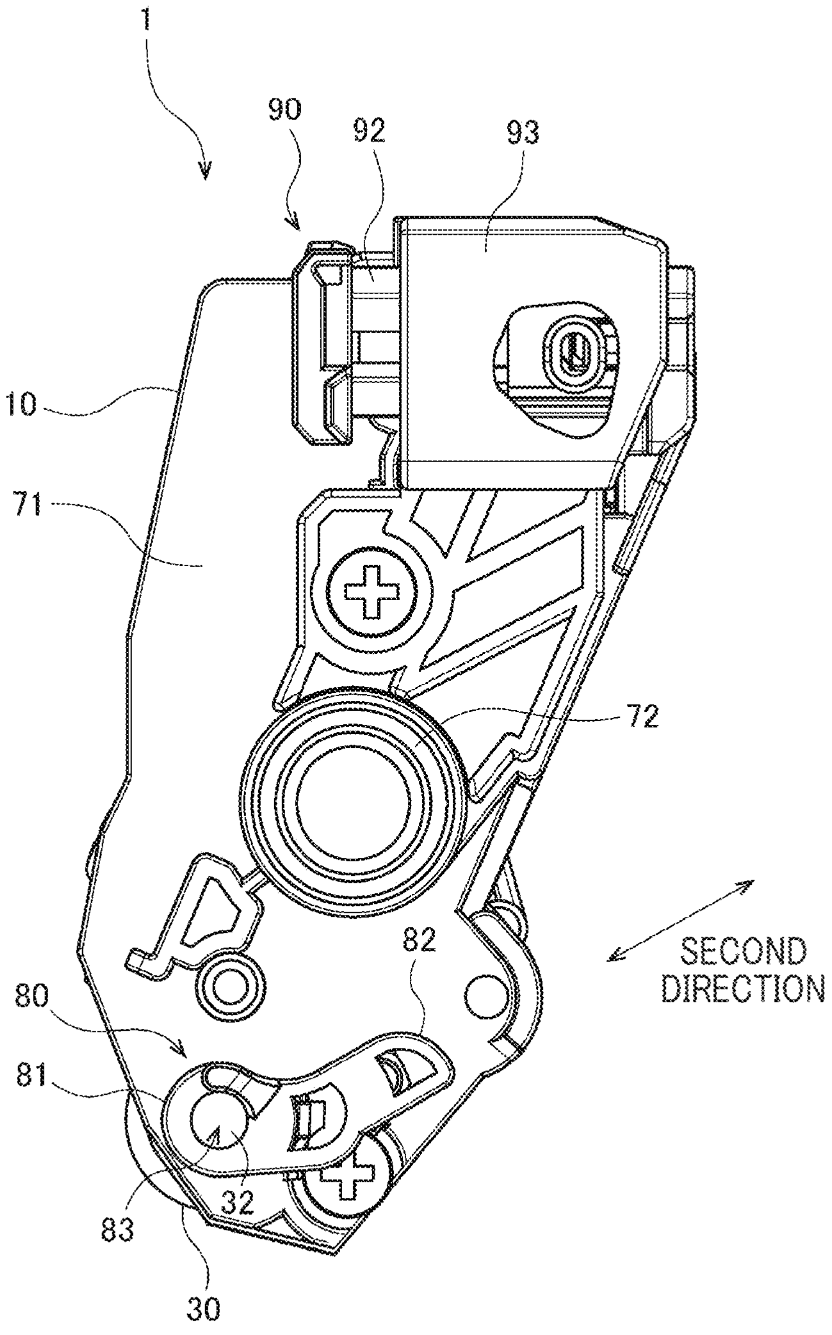
FIG. 3 is a view of the developing cartridge as viewed from a side of a second outer surface.
Figure 4:
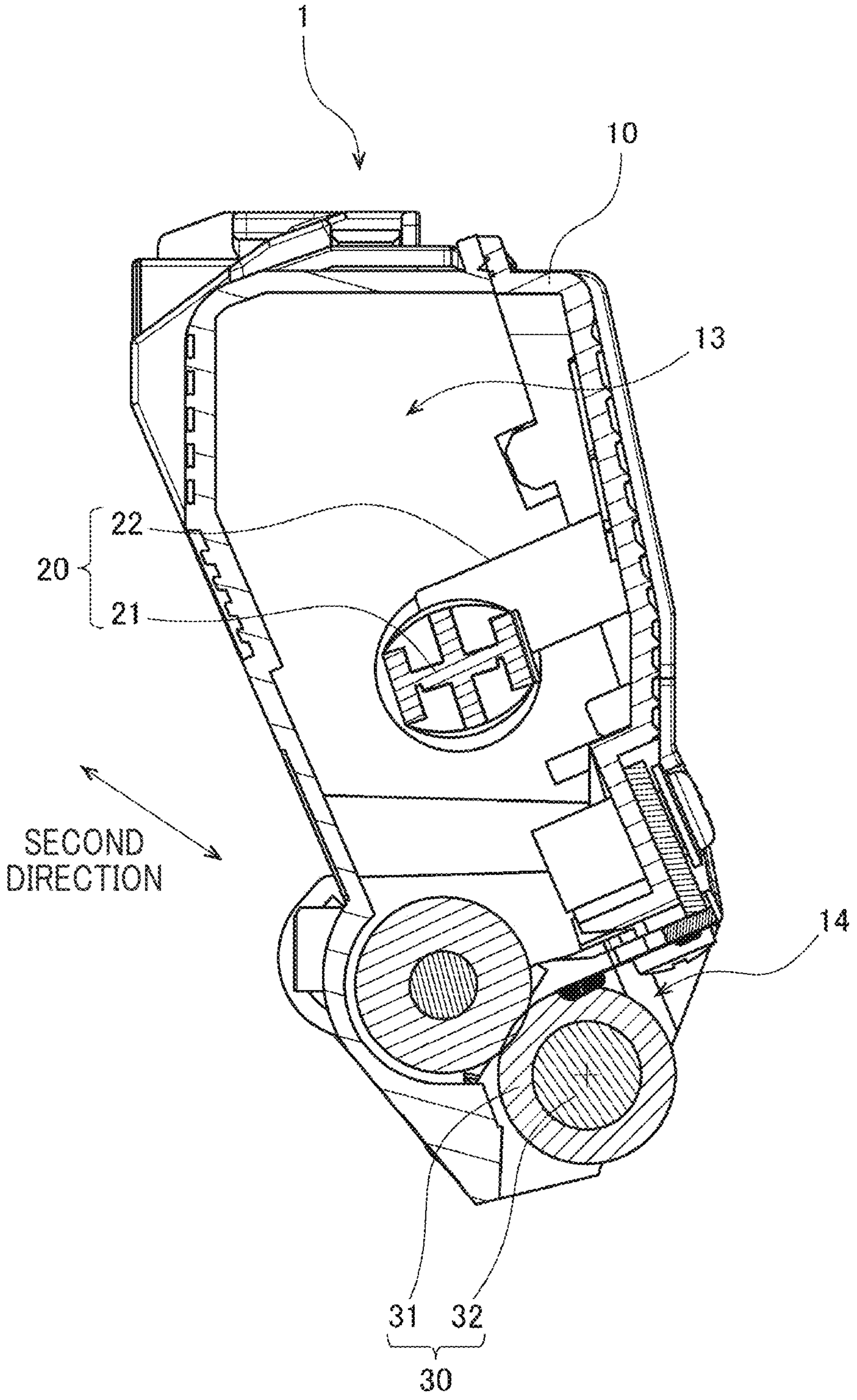
FIG. 4 is a cross-sectional view of the developing cartridge.
Figure 5:
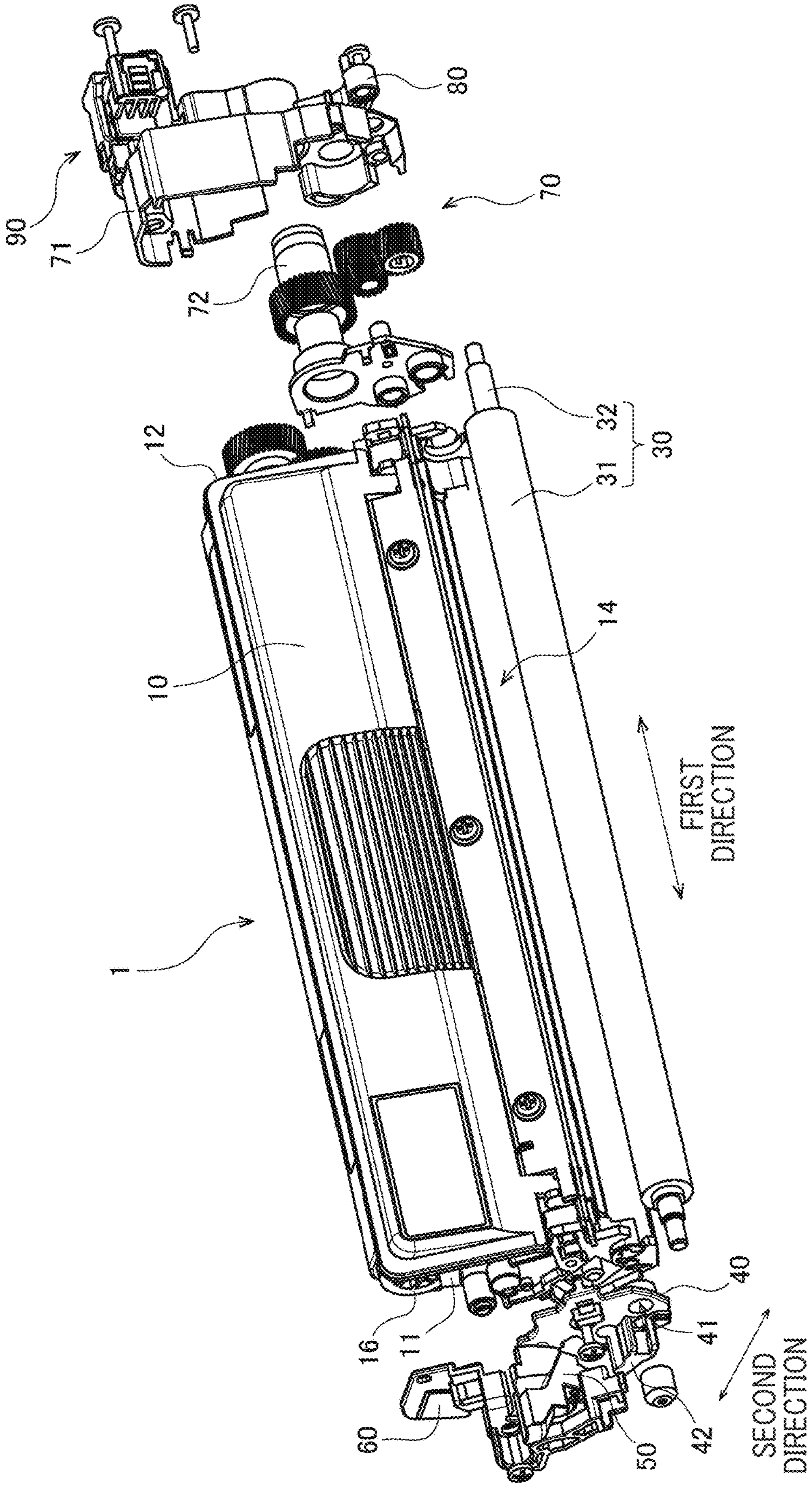
FIG. 5 is an exploded perspective view of the developing cartridge.

FIG. 1 is a perspective view of a developing cartridge 1. FIG. 2 is a view of the developing cartridge 1 as viewed from a side of a first outer surface 11 (described later). Note that a photosensitive drum 100 of a drum cartridge is also illustrated in FIG. 2. FIG. 3 is a view of the developing cartridge 1 as viewed from a side of a second outer surface 12 (described later). FIG. 4 is a cross-sectional view of the developing cartridge 1. Note that FIG. 4 illustrates a cross-section orthogonal to the first direction. FIG. 5 is an exploded perspective view of the developing cartridge 1.

The developing cartridge 1 is used with an electro-photographic type image forming apparatus. The image forming apparatus is a laser printer or an LED printer, for example. The developing cartridge 1 is attachable to and detachable from the drum cartridge including the photosensitive drum 100. The developing cartridge 1 is attached to the image forming apparatus while attached to the drum cartridge.

Four developing cartridges 1 are attachable to the image forming apparatus, for example. The four developing cartridges 1 accommodate therein developer of colors different from one another (for example, the colors of cyan, magenta, yellow, and black). The developer is, for example, toner. The image forming apparatus forms images on printing sheets using developer supplied from the developing cartridges 1. However, the number of developing cartridges 1 that can be attached to the image forming apparatus may be one through three, or five or more.

As illustrated in FIGS. 1 through 5, the developing cartridge 1 includes the casing 10, an agitator 20, the developing roller 30, a developing roller bearing 40, a first lever 50, a lever cover 60, a gear portion 70, a second lever 80, and a memory assembly 90.

The casing 10 is a housing configured to accommodate therein developer. The casing 10 has the first outer surface 11, and the second outer surface 12. The first outer surface 11 is positioned at one end portion in the first direction of the casing 10. The second outer surface 12 is positioned at another end portion in the first direction of the casing 10. The first outer surface 11 and the second outer surface 12 are positioned away from each other in the first direction. The casing 10 extends in both the first direction and the second direction.

The casing 10 has an accommodation chamber 13. The accommodation chamber 13 is positioned inside the casing 10. Developer is accommodated in the accommodation chamber 13. The casing 10 also has an opening 14. The opening 14 is positioned at the one end portion in the second direction of the casing 10. An outer space of the casing 10 and the accommodation chamber 13 are in communication with each other via the opening 14. Note that the casing 10 may include a handle at an outer surface of the other end portion in the second direction of the casing 10.

The casing 10 also has a filling port 15. The filling port 15 is positioned at the first outer surface 11. That is, the filling port 15 is positioned at the one end portion in the first direction of the casing 10. Also, the casing 10 includes a cap 16. The cap 16 is mountable on and removable from the filling port 15. In a state where the cap 16 is mounted on the filling port 15, the cap 16 covers the filling port 15.

The agitator 20 includes an agitator shaft 21, and a film 22. The agitator shaft 21 extends along the first direction. The film 22 expands toward an inner surface of the casing 10 from the agitator shaft 21. In other words, the film 22 expands radially outward from the agitator shaft 21. A part of the agitator shaft 21, and the film 22 are positioned inside the accommodation chamber 13 of the casing 10.

One end portion in the first direction of the agitator shaft 21 is fixed to an agitator gear included in the gear portion 70. When the agitator gear rotates, the agitator shaft 21 and the film 22 rotate about an agitator axis that extends in the first direction. When rotating, the film 22 agitates the developer in the accommodation chamber 13.

The developing roller 30 is a roller that is rotatable about a first axis extending in the first direction. The developing roller 30 is positioned at the opening 14 of the casing 10. In other words, the developing roller 30 is positioned at the one end portion in the second direction of the casing 10. When the developing cartridge 1 is attached to the drum cartridge, the developing roller 30 contacts the photosensitive drum 100.

The developing roller 30 includes a developing roller body 31, and a developing roller shaft 32. The developing roller body 31 is a hollow cylindrical member that extends in the first direction. A rubber having elasticity is used as material of the developing roller body 31, for example. The developing roller shaft 32 is a solid cylindrical member that penetrates the developing roller body 31 to extend in the first direction. The developing roller body 31 is fixed to the developing roller shaft 32. The developing roller shaft 32 is electrically conductive. The developing roller shaft 32 is made of metal or electrically conductive resin.

Note that the developing roller shaft 32 may not penetrate the developing roller body 31 in the first direction. For example, developing roller shafts 32 may respectively extend in the first direction from both ends in the first direction of the developing roller body 31.

The developing roller bearing 40 is positioned at the first outer surface 11 of the casing 10. That is, the developing roller bearing 40 is positioned at the one end portion in the first direction of the casing 10. More specifically, the developing roller bearing 40 is fixed to the first outer surface 11 of the casing 10. The developing roller bearing 40 is electrically conductive. Specifically, the developing roller bearing 40 is made of electrically conductive resin.

The developing roller bearing 40 has a bearing hole 41. The bearing hole 41 penetrates the developing roller bearing 40 in the first direction. One end portion in the first direction of the developing roller shaft 32 is inserted through the bearing hole 41. Therefore, the developing roller shaft 32 is rotatably supported by the developing roller bearing 40. Further, the one end portion in the first direction of the developing roller shaft 32 contacts the developing roller bearing 40. As a result, the developing roller bearing 40 is electrically connected to the developing roller shaft 32.

When the drum cartridge to which the developing cartridge 1 is attached is attached to the image forming apparatus, the image forming apparatus supplies a bias voltage to the developing roller shaft 32 via the developing roller bearing 40. Then, developer is carried on an outer circumferential surface of the developing roller body 31 due to an electrostatic force between the developing roller shaft 32 and the developer.

As illustrated in FIG. 2, the developing roller bearing 40 includes a bearing protrusion 42. The bearing protrusion 42 protrudes in the first direction from one end surface in the first direction of the developing roller bearing 40. The bearing protrusion 42 protrudes in a direction away from the casing 10 in the first direction. The bearing protrusion 42 is positioned between the developing roller shaft 32 and the first lever 50 in the second direction.

The first lever 50 is positioned at the first outer surface 11 of the casing 10. In other words, the first lever 50 is positioned at the one end portion in the first direction of the casing 10. The first lever 50 is positioned away from the developing roller 30 in the second direction. As illustrated in FIG. 2, the first lever 50 has one end portion 51 and another end portion 52, and includes a lever protrusion 53. The one end portion 51 and the other end portion 52 are positioned away from each other in a rotational direction about the lever protrusion 53. Also, the one end portion 51 is closer to the bearing protrusion 42 than the other end portion 52 is to the bearing protrusion 42. The lever protrusion 53 protrudes in the first direction from the first lever 50. The lever protrusion 53 extends in a direction away from the casing 10. The lever protrusion 53 is a hollow cylindrical or a solid cylindrical member centered on a second axis that extends in the first direction.

The first lever 50 is movable relative to the casing 10. In a state where the developing cartridge 1 is attached to the drum cartridge, the lever protrusion 53 can contact a frame of the drum cartridge. The first lever 50 is pivotally movable about the lever protrusion 53 between a first position and a second position. In other words, in a state where the developing cartridge 1 is attached to the drum cartridge, the first lever 50 is pivotally movable relative to the casing 10 about the second axis between the first position and the second position. The first lever 50 is an example of the lever.

The first outer surface 11 of the casing 10 has a casing contact surface 111. The casing contact surface 111 is positioned farther from the developing roller 30 than the one end portion 51 of the first lever 50 is from the developing roller 30 in the second direction. The casing contact surface 111 faces the one end portion 51 of the first lever 50 in the second direction. By the first lever 50 pivotally moving about the lever protrusion 53, the one end portion 51 can contact the casing contact surface 111.

The lever cover 60 is positioned at the first outer surface 11 of the casing 10. In other words, the lever cover 60 is positioned at the one end portion in the first direction of the casing 10. More specifically, the lever cover 60 is fixed to the first outer surface 11 of the casing 10. The lever cover 60 covers a part of the first lever 50. In other words, a part of the first lever 50 is positioned between the first outer surface 11 of the casing 10 and the lever cover 60. The lever cover 60 holds the first lever 50 while the first lever 50 is movable relative to the casing 10.

However, the other end portion 52 of the first lever 50 protrudes in a direction away from the casing 10 in the first direction. The lever cover 60 is positioned between the other end portion 52 and the lever protrusion 53 of the first lever 50. Both the other end portion 52 and the lever protrusion 53 of the first lever 50 can contact the lever cover 60. This configuration restrains the first lever 50 from being removed from the casing 10 and the lever cover 60.

The lever cover 60 covers the filling port 15 and the cap 16. The lever cover 60 and the cap 16 face each other in the first direction. This arrangement restrains removal of the cap 16 from the casing 10. The lever cover 60 may cover the filling port 15 and the cap 16 entirely, or may cover only parts of the filling port 15 and the cap 16. In other words, the lever cover 60 need only cover at least a part of the filling port 15 and the cap 16.

The gear portion 70 is positioned at the second outer surface 12 of the casing 10. In other words, the gear portion 70 is positioned at the other end portion in the first direction of the casing 10. The gear portion 70 includes a gear cover 71, a coupling 72, and a plurality of gears. The gear cover 71 constitutes the housing of the developing cartridge 1 in cooperation with the casing 10. The gear cover 71 is fixed to the second outer surface 12 of the casing 10. The gears include the agitator gear fixed to the agitator shaft 21, and a developing roller gear fixed to the developing roller shaft 32. At least a part of the gears is positioned between the second outer surface 12 and the gear cover 71.

The coupling 72 is exposed through the gear cover 71. When the developing cartridge 1 is attached to the image forming apparatus while the developing cartridge 1 is attached the drum cartridge, a drive shaft in the image forming apparatus is coupled to the coupling 72. Rotation of the drive shaft is then transmitted to the agitator gear and the developing roller gear via the coupling 72. The plurality of gears included in the gear portion 70 may transmit a rotational force through engagement of gear teeth or by friction.

The second lever 80 is positioned at the second outer surface 12 of the casing 10. In other words, the second lever 80 is positioned at the other end portion in the first direction of the casing 10. More specifically, the second lever 80 is positioned at an outer surface of the gear cover 71. As illustrated in FIG. 3, the second lever 80 has one end portion 81, and another end portion 82. The other end portion 82 is positioned farther from the developing roller shaft 32 than the one end portion 81 is from the developing roller shaft 32. Also, the other end portion 82 is positioned farther from the one end portion in the second direction of the casing 10 than the one end portion 81 is from the one end portion in the second direction of the casing 10 in the second direction. The second lever 80 extends along the second outer surface 12 of the casing 10 between the one end portion 81 and the other end portion 82.

The second lever 80 has a through-hole 83. The through-hole 83 penetrates the one end portion 81 of the second lever 80 in the first direction. The through-hole 83 has a hollow cylindrical inner circumferential surface. Another end portion in the first direction of the developing roller shaft 32 is inserted through the through-hole 83. Accordingly, the second lever 80 is pivotally movable about the developing roller shaft 32 relative to the casing 10. Specifically, the other end portion 82 of the second lever 80 is pivotally movable about the developing roller shaft 32 relative to the one end portion 81 of the second lever 80.

After the developing cartridge 1, while attached to the drum cartridge, is attached to the image forming apparatus, the developing cartridge 1 can perform a separating operation using a driving force supplied from the image forming apparatus. The separating operation is an operation for temporarily separating the developing roller 30 from the photosensitive drum 100.

When performing the separating operation, the image forming apparatus presses the other end portion 52 of the first lever 50. Accordingly, the first lever 50 pivotally moves relative to the casing 10 about the lever protrusion 53. The first lever 50 pivotally moves from the first position to the second position. As a result, the one end portion 51 of the first lever 50 contacts the casing contact surface 111 of the casing 10. The one end portion 51 of the first lever 50 then presses the casing contact surface 111 of the casing 10 in a direction away from the photosensitive drum 100 in the second direction. Consequently, the casing 10 moves in a direction away from the photosensitive drum 100 in the second direction. As a result, the developing roller 30 moves from a contacting position (a position indicated by two-dotted chain lines in FIG. 2) in which the developing roller 30 contacts the photosensitive drum 100 to a separated position (a position indicated by a solid line in FIG. 2) in which the developing roller 30 is separated from the photosensitive drum 100.

When performing the separating operation, the image forming apparatus also presses a cam of the drum cartridge. Accordingly, the cam contacts the one end portion 81 of the second lever 80, and presses the one end portion 81 of the second lever 80 in a direction away from the photosensitive drum 100 in the second direction. Therefore, the casing 10 moves in a direction away from the photosensitive drum 100 in the second direction. As a result, the developing roller 30 moves from the contacting position in which the developing roller 30 contacts the photosensitive drum 100 to the separated position in which the developing roller 30 is separated from the photosensitive drum 100.

The memory assembly 90 is positioned at the second outer surface 12 of the casing 10. In other words, the memory assembly 90 is positioned at the other end portion in the first direction of the casing 10. More specifically, the memory assembly 90 is positioned at the outer surface of the gear cover 71. The memory assembly 90 has a memory 91 which is a storage medium, a holder 92 that holds the memory 91, and a holder cover 93. The memory 91 is an IC chip, for example. The memory 91 is positioned at an outer surface of the holder 92.

The memory 91 can store therein various information related to the developing cartridge 1. Specifically, the memory 91 stores therein at least one of the cumulative number of sheets printed using the developing roller 30, the cumulative number of revolutions of the developing roller 30, and the cumulative amount of developer consumed. This information is information that represents the service life of the developing cartridge 1. The memory 91 may also store therein such information as a serial number of the developing cartridge 1, compatible models for the developing cartridge 1, and the like.

The memory 91 has an electrical contact surface 911. The electrical contact surface 911 is made of metal which is electrically conductive material. When the drum cartridge to which the developing cartridge 1 is attached is attached to the image forming apparatus, the electrical contact surface 911 contacts a terminal in the image forming apparatus.

The holder cover 93 is fixed to the outer surface of the gear cover 71. The holder 92 is positioned between the gear cover 71 and the holder cover 93. The holder 92 is held in a state in which the holder 92 is movable relative to the casing 10, the gear cover 71, and the holder cover 93.

2. Recycling Developing Cartridges

Next, a process performed when recycling the above developing cartridge 1 will be described. Recycling of the developing cartridge 1 is an operation performed for bringing the developing cartridge 1 into a reusable condition by inspecting the used developing cartridge 1, refilling the accommodation chamber 13 in the developing cartridge 1 with developer, and replacing parts in the developing cartridge 1 if necessary.

Figure 6:
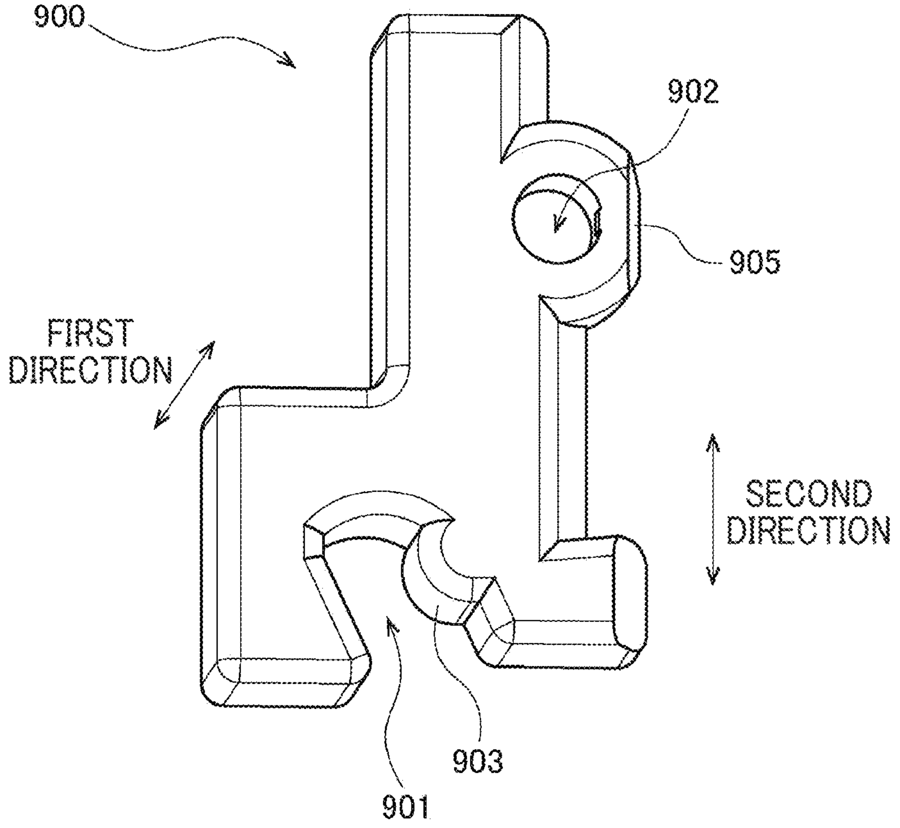
FIG. 6 is a perspective view of a jig.
Figure 7:
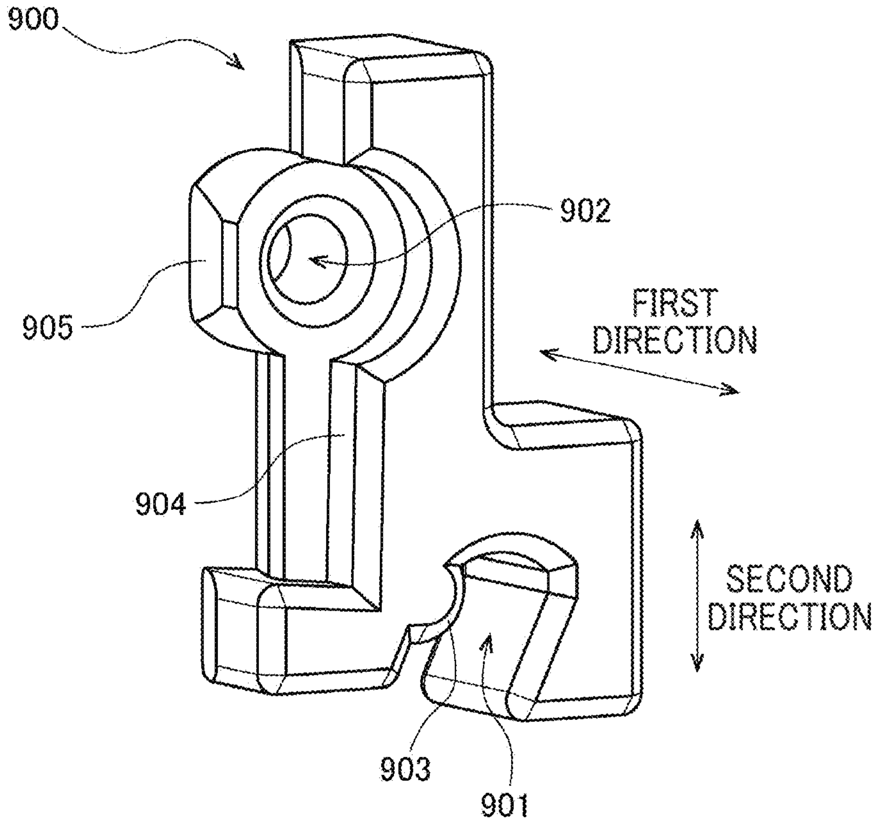
FIG. 7 is a perspective view of the jig.

FIGS. 6 and 7 are perspective views of a jig 900 used when recycling the developing cartridge 1. As illustrated in FIGS. 6 and 7, the jig 900 has a bearing groove 901, and a lever hole 902.

The bearing groove 901 is a groove in which the bearing protrusion 42 described above can be inserted. When the jig 900 is in its posture for use, the bearing groove 901 is recessed in the second direction. The bearing groove 901 also extends in the first direction when the jig 900 is in the posture for use. The lever hole 902 is a hole in which the lever protrusion 53 described above can be inserted. When the jig 900 is in the posture for use, the lever hole 902 penetrates the jig 900 in the first direction. However, the lever hole 902 may also be a recess that is recessed in the first direction when the jig 900 is in the posture for use.

2-1. First Embodiment

Figure 8:
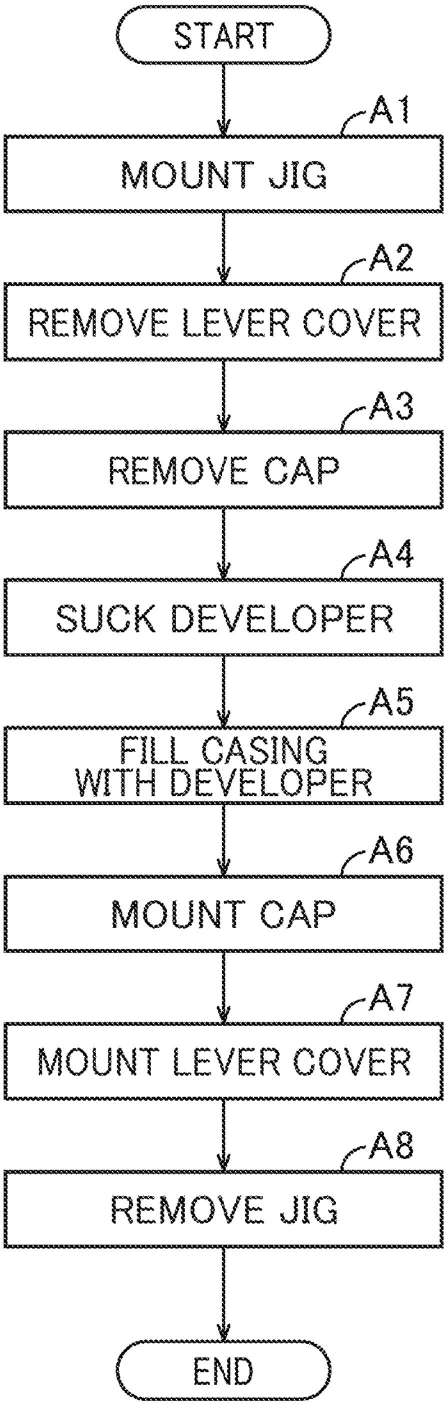
FIG. 8 is a flowchart illustrating a recycling process.

First, a recycling process according to a first embodiment will be described. FIG. 8 is a flowchart illustrating the recycling process according to the first embodiment.

Figure 9:
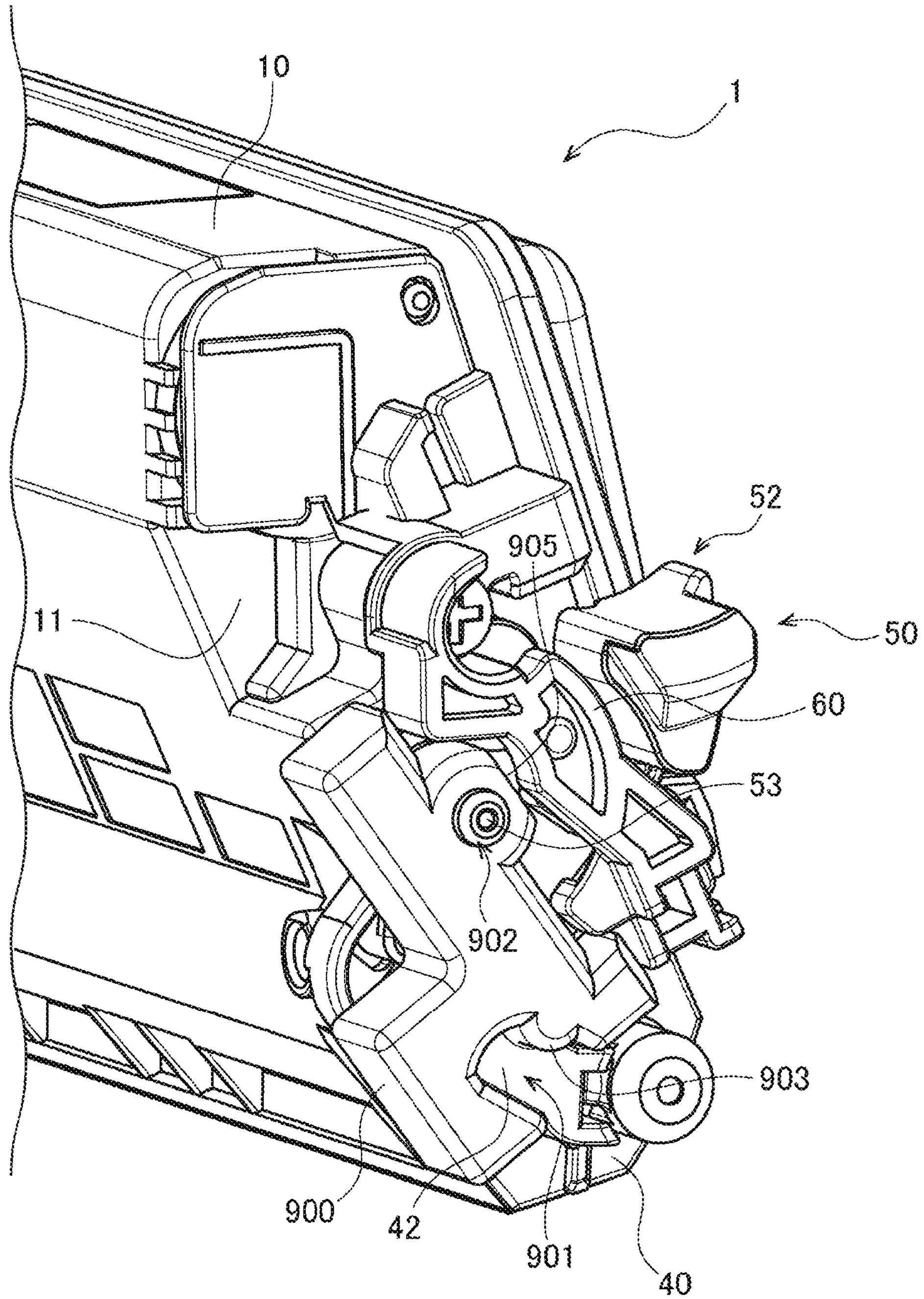
FIG. 9 is a partial perspective view of the developing cartridge in a state where the jig is mounted thereon.
Figure 10:
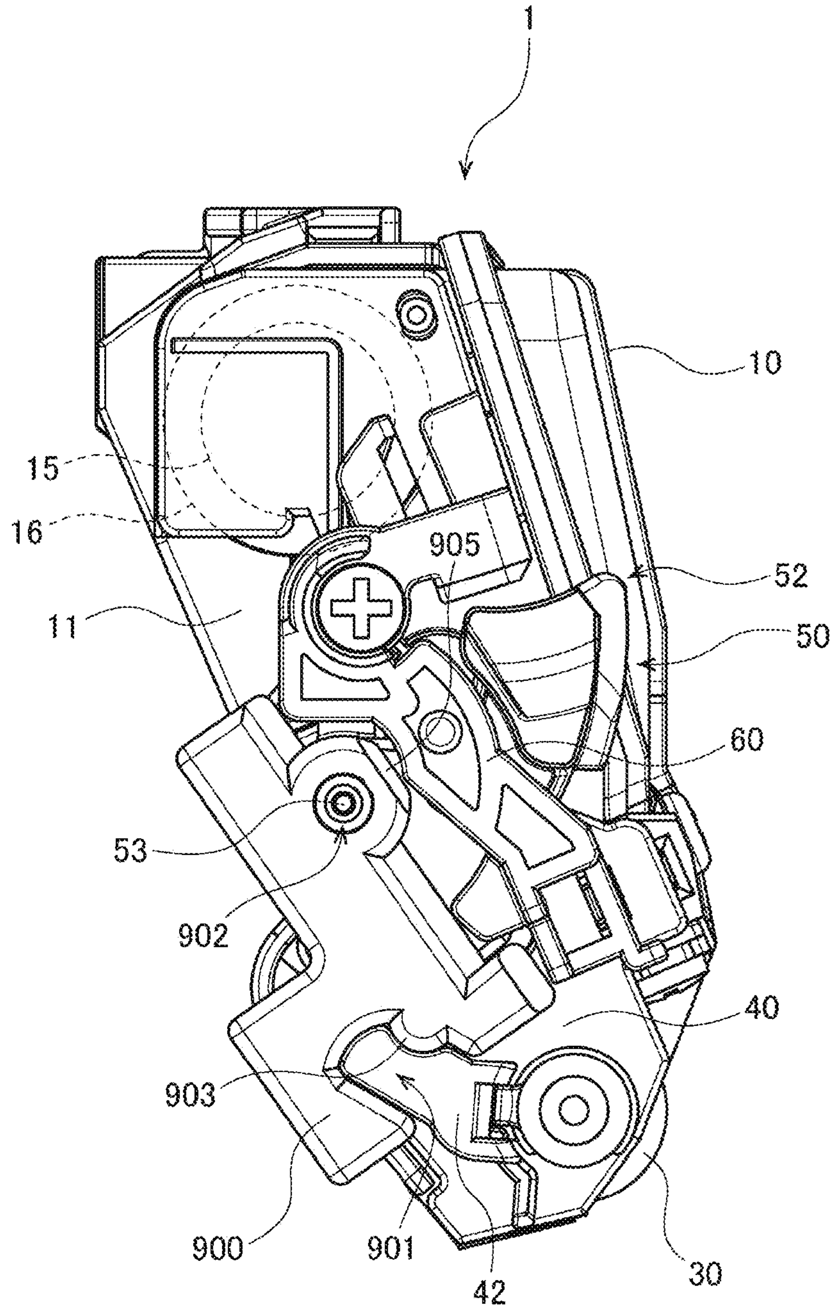
FIG. 10 is a view of the developing cartridge in a state where the jig is mounted thereon as viewed from the side of the first outer surface.

When performing recycling according to the first embodiment, an operator first mounts the jig 900 on both the casing 10 and the first lever 50 (step A1, a jig mounting step). FIG. 9 is a partial perspective view of the developing cartridge 1 in a state where the jig 900 is mounted thereon. FIG. 10 is a view of the developing cartridge 1 in a state where the jig 900 is mounted thereon as viewed from the side of the first outer surface 11.

As illustrated in FIGS. 9 and 10, in step A1, the bearing protrusion 42 of the developing roller bearing 40 is inserted into the bearing groove 901 of the jig 900. As a result, the jig 900 is mounted on both the casing 10 and the developing roller bearing 40. Also, as illustrated in FIGS. 9 and 10, in step A1, the lever protrusion 53 of the first lever 50 is inserted into the lever hole 902 of the jig 900. As a result, movement of the first lever 50 relative to the casing 10 is restricted. In other words, the first lever 50 is held on the casing 10 through the jig 900.

Also, the jig 900 includes a press-fitting protrusion 903. The press-fitting protrusion 903 protrudes toward an inside of the bearing groove 901 from an edge of the bearing groove 901. As illustrated in FIGS. 9 and 10, in step A1, the press-fitting protrusion 903 contacts the bearing protrusion 42. With this configuration, the bearing protrusion 42 is press-fitted into the bearing groove 901. As a result, the jig 900 is fixed to the casing 10 and the developing roller bearing 40.

Also, in step A1, the lever protrusion 53 is press-fitted into the lever hole 902. Therefore, the first lever 50 is fixed to the jig 900. Also, pivotal movement of the first lever 50 relative to the jig 900 about the lever protrusion 53 is restrained.

As illustrated in FIG. 7, the jig 900 also has a jig contact surface 904. The jig contact surface 904 faces the first lever 50 in a state where the jig 900 is mounted on both the casing 10 and the first lever 50. More specifically, the jig contact surface 904 faces a part of the first lever 50 in a pivot direction in which the first lever 50 pivotally moves about the lever protrusion 53. When the first lever 50 pivotally moves about the lever protrusion 53 in a state where the jig 900 is mounted on both the casing 10 and the first lever 50, the first lever 50 contacts the jig contact surface 904 or the casing contact surface 111 of the casing 10. As a result, a range of the pivotal movement of the first lever 50 relative to the jig 900 is limited.

Figure 11:
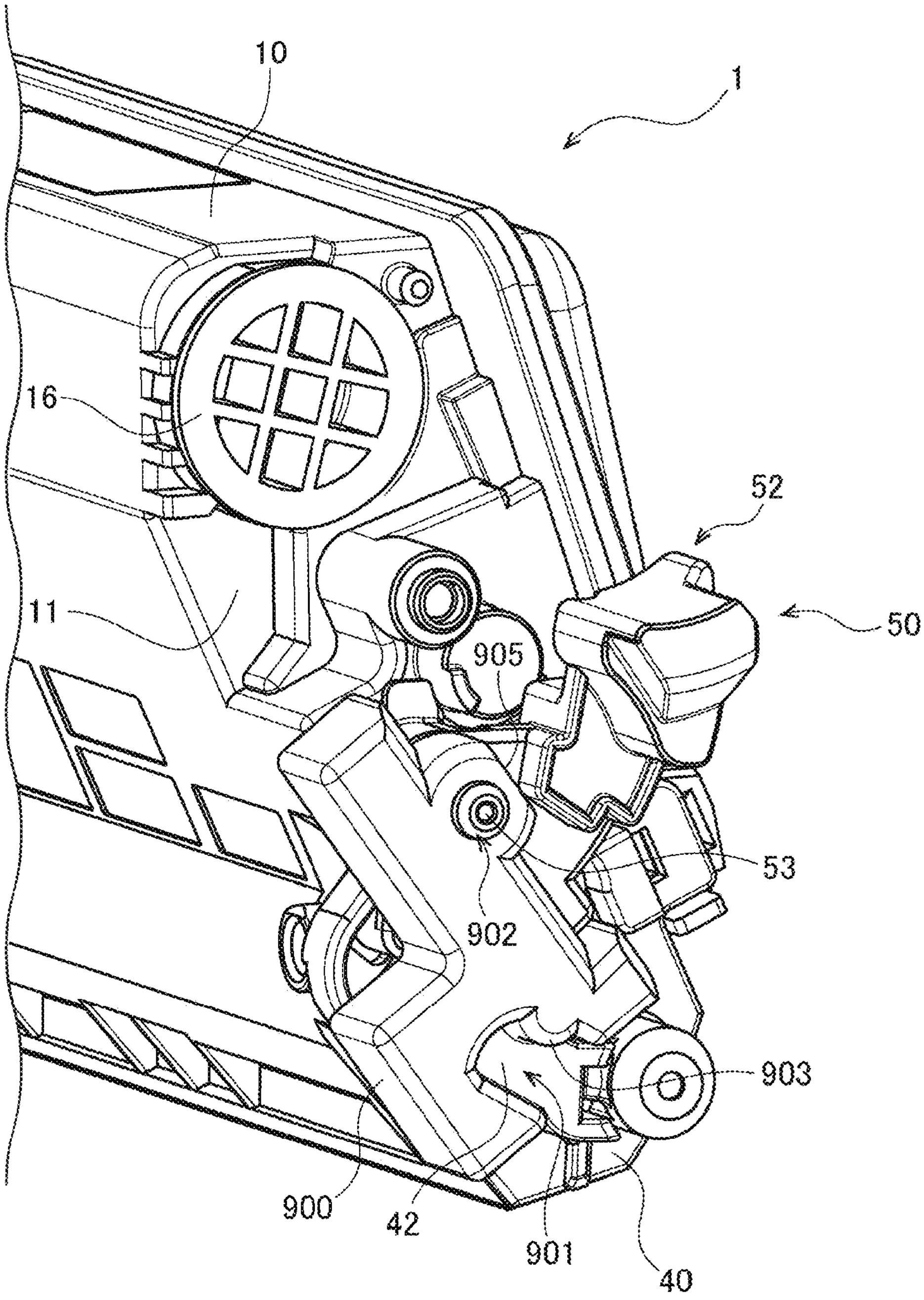
FIG. 11 is a partial perspective view of the developing cartridge in a state where a lever cover is removed therefrom.
Figure 12:
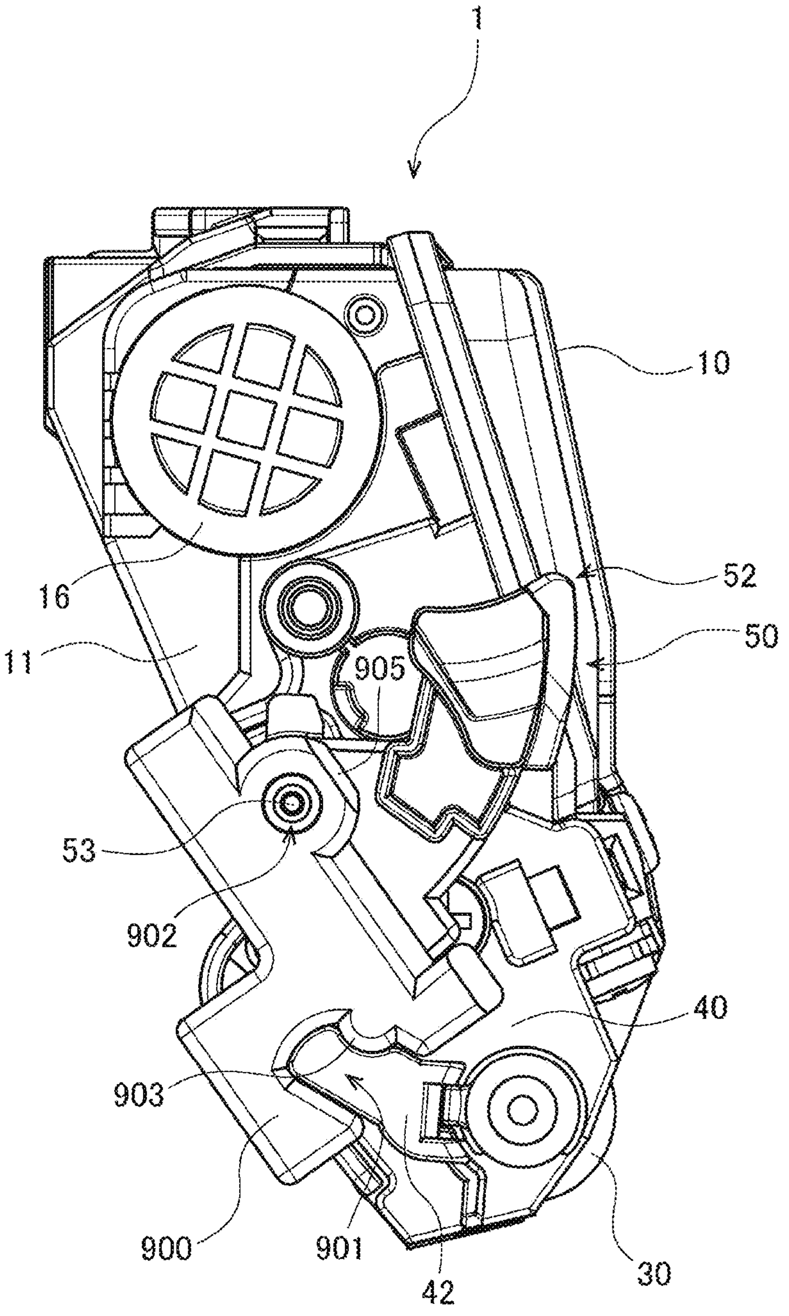
FIG. 12 is a view of the developing cartridge in a state where the lever cover is removed therefrom as viewed from the side of the first outer surface.

Next, the operator removes the lever cover 60 from the casing 10 (step A2, a cover removing step). Specifically, the operator first removes a bolt fixing the lever cover 60 to the casing 10. Then the operator removes the lever cover 60 from the first outer surface 11 of the casing 10. FIG. 11 is a partial perspective view of the developing cartridge 1 in a state where the lever cover 60 is removed therefrom. FIG. 12 is a view of the developing cartridge 1 in a state where the lever cover 60 is removed therefrom as viewed from the side of the first outer surface 11.

As illustrated in FIGS. 11 and 12, the cap 16 for the filling port 15 is exposed after the lever cover 60 is removed. At this time, the first lever 50 is held on the casing 10 through the jig 900. Therefore, the first lever 50 is held on the casing 10 though the lever cover 60 is removed. Accordingly, the operator can perform an operation of removing the lever cover 60 while the first lever 50 is held on the first outer surface 11 of the casing 10.

The operator inspects the removed lever cover 60. The operator prepares a new lever cover 60 if necessary.

Next, the operator removes the cap 16 from the casing 10 (step A3, a cap removing step). Accordingly, the filling port 15 is opened. At this time, the first lever 50 is held on the casing 10 through the jig 900. Therefore, the operator can perform an operation of removing the cap 16 while the first lever 50 is held on the first outer surface 11 of the casing 10.

The operator inspects the removed cap 16. The operator prepares a new cap 16 if necessary.

Next, the operator sucks out developer remaining in the accommodation chamber 13 of the casing 10 (step A4, a sucking step). Specifically, the operator inserts a suction device into the filling port 15 and sucks developer in the accommodation chamber 13 into the suction device. As a result, the developer is removed from the accommodation chamber 13 of the casing 10. At this time, the first lever 50 is held on the casing 10 through the jig 900. Therefore, the operator can perform an operation to suck the developer while the first lever 50 is held on the first outer surface 11 of the casing 10.

Next, the operator fills the casing 10 with new developer (step A5, a filling step). Specifically, the operator supplies developer into the accommodation chamber 13 in the casing 10 through the filling port 15. At this time, the first lever 50 is held on the casing 10 through the jig 900. Therefore, the operator can perform an operation to refill the casing 10 with developer while the first lever 50 is held on the first outer surface 11 of the casing 10.

Next, the operator mounts the cap 16 on the casing 10 (step A6, a cap mounting step). Accordingly, the filling port 15 is closed. Here, the cap 16 mounted on the casing 10 may be the cap 16 removed in step A3, or may be a new cap 16.

When the cap 16 is mounted, the developing cartridge 1 becomes a state illustrated in FIGS. 11 and 12. At this time, the first lever 50 is held on the casing 10 through the jig 900. Therefore, the operator can perform an operation of mounting the cap 16 while the first lever 50 is held on the first outer surface 11 of the casing 10.

Next, the operator mounts the lever cover 60 on the casing 10 (step A7, a cover mounting step). Through this step, the developing cartridge 1 becomes a state illustrated in FIGS. 9 and 10. Here, the lever cover 60 mounted on the casing 10 may be the lever cover 60 removed in step A2, or may be a new lever cover 60.

Specifically, the operator fixes the lever cover 60 to the first outer surface 11 of the casing 10 with the bolt. Accordingly, the lever cover 60 covers the cap 16 mounted on the filling port 15. At this time, the first lever 50 is held on the casing 10 through the jig 900. Therefore, the operator can perform an operation of mounting the lever cover 60 while the first lever 50 is held on the first outer surface 11 of the casing 10.

Figure 13:
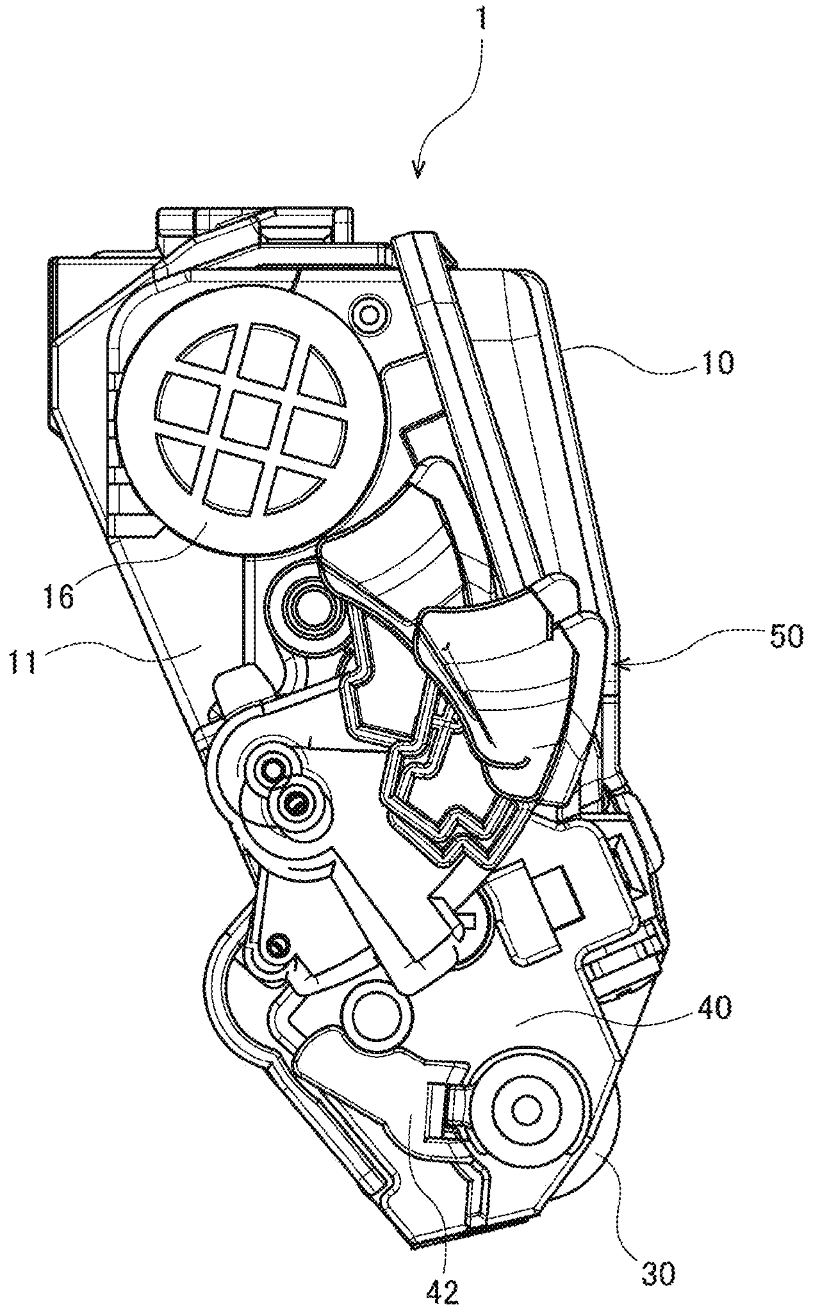
FIG. 13 is a view illustrating a movable range of a first lever when the jig is not mounted thereon.

FIG. 13 illustrates a movable range of the first lever 50 when the jig 900 is not mounted thereon. Although the lever cover 60 is omitted from FIG. 13, the movable range of the first lever 50 is illustrated in FIG. 13 in a case where the lever cover 60 is mounted on the casing 10. When the jig 900 is not mounted, as illustrated in FIG. 13, the first lever 50 is movable relative to the casing 10, even when the lever cover 60 is mounted on the casing 10.

However, the jig 900 can be used to limit such movement of the first lever 50. The position of the first lever 50 relative to the casing 10 when the lever cover 60 is mounted in step A7 does not change since the lever cover 60 has been removed in step A2. Therefore, the lever cover 60 can be mounted on the first outer surface 11 of the casing 10 without contacting the first lever 50.

As illustrated in FIGS. 9 through 12, the jig 900 has a guide surface 905. In a state where the jig 900 is mounted on the casing 10 and the first lever 50, the guide surface 905 is positioned between the lever protrusion 53 and the other end portion 52 of the first lever 50. Further, in a state where the jig 900 is mounted on the casing 10 and the first lever 50, the guide surface 905 is inclined relative to the first direction. More specifically, in a state where the jig 900 is mounted on both the casing 10 and the first lever 50, the guide surface 905 approaches the other end portion 52 of the first lever 50 while approaching the casing 10 in the first direction.

In step A7, the operator moves the lever cover 60 toward the first outer surface 11 of the casing 10 while the lever cover 60 is in contact with the guide surface 905. Accordingly, the guide surface 905 guides the lever cover 60, thereby enabling the lever cover 60 to be easily positioned relative to the casing 10. In this way, the operation of mounting the lever cover 60 on the casing 10 can be performed easily.

Subsequently, the operator removes the jig 900 from the casing 10 and the first lever 50 (step A8, a jig removing step). Specifically, the lever protrusion 53 of the first lever 50 is extracted from the lever hole 902 of the jig 900, and the bearing protrusion 42 of the developing roller bearing 40 is extracted from the bearing groove 901 in the jig 900. As a result, the jig 900 is removed from the casing 10 and the first lever 50.

2-2. Second Embodiment

Figure 14:
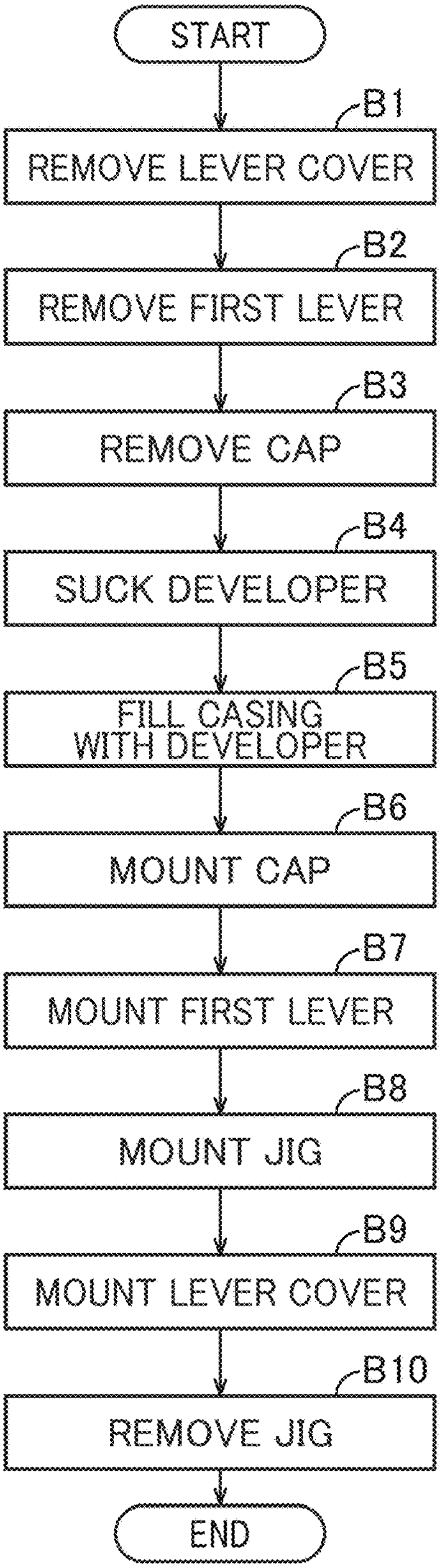
FIG. 14 is a flowchart illustrating a recycling process.

Next, a recycling process according to a second embodiment will be described. FIG. 14 is a flowchart illustrating the recycling process according to the second embodiment.

When performing recycling according to the second embodiment, the operator first removes the lever cover 60 from the casing 10 (step B1, a cover removing step). Specifically, the operator first removes a bolt that fixes the lever cover 60 to the casing 10. The operator then removes the lever cover 60 from the first outer surface 11 of the casing 10. The cap 16 for the filling port 15 is exposed after the lever cover 60 is removed. Further, the first lever 50 is no longer held by the lever cover 60 once the lever cover 60 is removed.

The operator inspects the removed lever cover 60. The operator prepares a new lever cover 60 if necessary.

Next, the operator removes the first lever 50 from the casing 10 (step B2, a lever removing step). The operator inspects the removed first lever 50. The operator prepares a new first lever 50 if necessary.

Next, the operator removes the cap 16 from the casing 10 (step B3, a cap removing step). Consequently, the filling port 15 is opened. The operator inspects the removed cap 16. The operator prepares a new cap 16 if necessary.

Next, the operator sucks out developer remaining in the accommodation chamber 13 of the casing 10 (step B4, a sucking step). Specifically, the operator inserts a suction device into the filling port 15 and sucks developer inside the accommodation chamber 13 into the suction device. As a result, the developer is removed from the accommodation chamber 13 of the casing 10.

Next, the operator fills the casing 10 with new developer (step B5, a filling step). Specifically, the operator supplies developer into the accommodation chamber 13 of the casing 10 through the filling port 15.

Next, the operator mounts the cap 16 on the casing 10 (step B6, a cap mounting step). Accordingly, the filling port 15 is closed. Here, the cap 16 mounted on the casing 10 may be the cap 16 removed in step B3, or may be a new cap 16.

Next, the operator mounts the first lever 50 on the casing 10 (step B7, a lever mounting step). Specifically, the operator mounts the first lever 50 on the first outer surface 11 of the casing 10. Here, the first lever 50 mounted on the first outer surface 11 of the casing 10 may be the first lever 50 removed in step B2, or may be a new first lever 50.

Next, the operator mounts the jig 900 on the casing 10 and the first lever 50 (step B8, a jig mounting step). As a result, the developing cartridge 1 becomes the state illustrated in FIGS. 11 and 12.

As illustrated in FIGS. 11 and 12, in step B8, the bearing protrusion 42 of the developing roller bearing 40 is inserted in the bearing groove 901 of the jig 900. As a result, the jig 900 is mounted on the casing 10 and the developing roller bearing 40. Also, as illustrated in FIGS. 11 and 12, in step S8 the lever protrusion 53 of the first lever 50 is inserted in the lever hole 902 of the jig 900. Accordingly, the first lever 50 is mounted on the jig 900. As a result, movement of the first lever 50 relative to the casing 10 is restricted. In other words, the first lever 50 is held on the casing 10 through the jig 900.

As illustrated in FIGS. 11 and 12, in step B8, the press-fitting protrusion 903 contacts the bearing protrusion 42. With this configuration, the bearing protrusion 42 is press-fitted into the bearing groove 901. As a result, the jig 900 is fixed to the casing 10 and the developing roller bearing 40. Further, in step S8, the lever protrusion 53 is press-fitted into the lever hole 902 in step B8. Therefore, the first lever 50 is fixed to the jig 900. Also, the pivotal movement of the first lever 50 relative to the jig 900 about the lever protrusion 53 is restrained.

Further, when the first lever 50 pivotally moves about the lever protrusion 53 while the jig 900 is mounted on both the casing 10 and the first lever 50, the first lever 50 contacts the jig contact surface 904 or the casing contact surface 111 of the casing 10. Accordingly, the range of the pivotal movement of the first lever 50 relative to the jig 900 is limited.

Next, the operator mounts the lever cover 60 on the casing 10 (step B9, a cover mounting step). Through this step, the developing cartridge 1 becomes the state illustrated in FIGS. 9 and 10. Here, the lever cover 60 mounted on the casing 10 may be the lever cover 60 removed in step B1, or may be a new lever cover 60.

Specifically, the operator fixes the lever cover 60 to the first outer surface 11 of the casing 10 with the bolt. Therefore, the cap 16 mounted on the filling port 15 is covered by the lever cover 60. At this time, the first lever 50 is held on the casing 10 through the jig 900. Therefore, the operator can perform the operation for mounting the lever cover 60 while the first lever 50 is held on the first outer surface 11 of the casing 10.

In step B9, the operator moves the lever cover 60 toward the first outer surface 11 of the casing 10 while the lever cover 60 is in contact with the guide surface 905. In this way, the guide surface 905 guides the lever cover 60 so that the lever cover 60 can be easily positioned relative to the casing 10. Accordingly, the operation for mounting the lever cover 60 on the casing 10 can be performed easily.

Subsequently, the operator removes the jig 900 from the casing 10 and the first lever 50 (step B10, a jig removing step). Specifically, the lever protrusion 53 of the first lever 50 is extracted from the lever hole 902 in the jig 900. Also, the bearing protrusion 42 of the developing roller bearing 40 is extracted from the bearing groove 901 in the jig 900. As a result, the jig 900 is removed from the casing 10 and the first lever 50.

2-3. Third Embodiment

Figure 15:
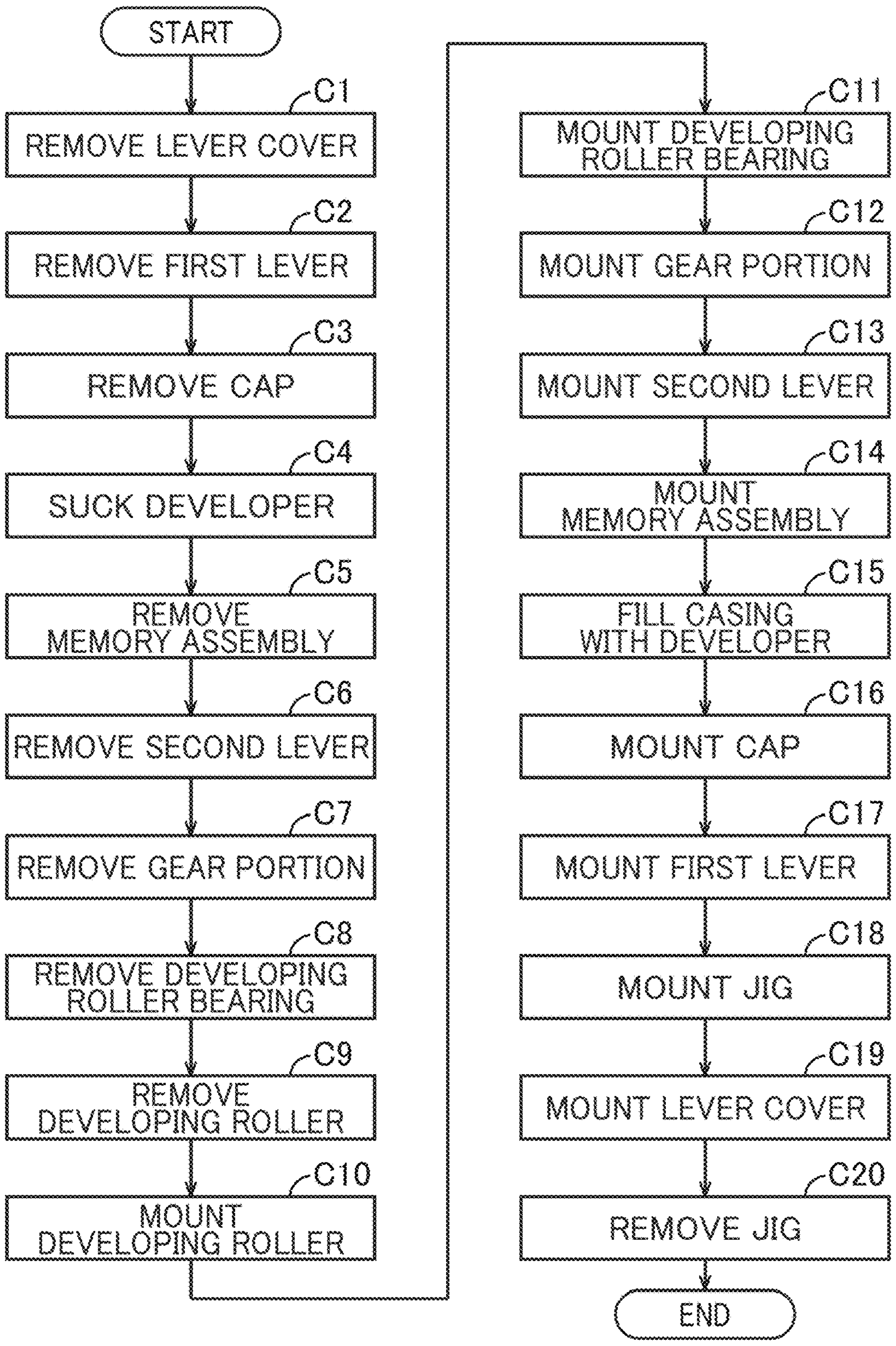
FIG. 15 is a flowchart illustrating a recycling process.

Next, a recycling process according to a third embodiment will be described. FIG. 15 is a flowchart illustrating the recycling process according to the third embodiment.

When performing recycling according to the third embodiment, the operator first removes the lever cover 60 from the casing 10 (step C1, a cover removing step). Specifically, the operator first removes a bolt that fixes the lever cover 60 to the casing 10. The operator then removes the lever cover 60 from the first outer surface 11 of the casing 10. The cap 16 for the filling port 15 is exposed after the lever cover 60 is removed. Further, the first lever 50 is no longer held by the lever cover 60 once the lever cover 60 is removed.

The operator inspects the removed lever cover 60. The operator prepares a new lever cover 60 if necessary.

Next, the operator removes the first lever 50 from the casing 10 (step C2, a lever removing step). The operator inspects the removed first lever 50. The operator prepares a new first lever 50 if necessary.

Next, the operator removes the cap 16 from the casing 10 (step C3, a cap removing step). As a result, the filling port 15 is opened. The operator inspects the removed cap 16. The operator prepares a new cap 16 if necessary.

Next, the operator sucks out developer remaining in the accommodation chamber 13 of the casing 10 (step C4, a sucking step). Specifically, the operator inserts a suction device into the filling port 15 and sucks developer from the accommodation chamber 13 into the suction device. Therefore, the developer is removed from the accommodation chamber 13 of the casing 10.

Next, the operator removes the memory assembly 90 from the casing 10 (step C5, a memory assembly removing step). Specifically, the operator first removes a bolt that fixes the holder cover 93 to the gear cover 71. The operator then removes the holder cover 93 from the outer surface of the gear cover 71. Subsequently, the operator removes the holder 92 from the outer surface of the gear cover 71.

The operator inspects the removed memory assembly 90. The operator overwrites information in the memory 91 as needed. The operator also replaces the memory 91 with a new memory 91 if necessary. The operator also prepares a new holder 92 or a new holder cover 93 if necessary.

Next, the operator removes the second lever 80 from the casing 10 (step C6, a second lever removing step). Specifically, the operator removes the second lever 80 from the other end portion in the first direction of the developing roller shaft 32. The operator inspects the removed second lever 80. The operator prepares a new second lever 80 if necessary.

Next, the operator removes the gear portion 70 from the casing 10 (step C7, a gear portion removing step). Specifically, the operator first removes a bolt fixing the gear cover 71 to the casing 10. The operator then removes the gear cover 71 from the second outer surface 12 of the casing 10. Subsequently, the operator removes the coupling 72 and the plurality of gears from the second outer surface 12 of the casing 10.

The operator inspects the removed gear cover 71, coupling 72, and gears. The operator prepares a new gear cover 71, a new coupling 72, or new gears if necessary.

Next, the operator removes the developing roller bearing 40 from the casing 10 (step C8, a developing roller bearing removing step). Specifically, the operator first removes a bolt that fixes the developing roller bearing 40 to the casing 10. The operator then removes the developing roller bearing 40 from the first outer surface 11 of the casing 10. The operator inspects the removed developing roller bearing 40. The operator prepares a new developing roller bearing 40 if necessary.

Next, the operator removes the developing roller 30 from the casing 10 (step C9, a developing roller removing step). Specifically, the operator removes the developing roller 30 from the opening 14 in the casing 10. The operator inspects the removed developing roller 30. The operator prepares a new developing roller 30 if necessary.

Next, the operator mounts the developing roller 30 on the casing 10 (step C10, a developing roller mounting step). Specifically, the operator mounts the developing roller 30 on the opening 14 in the casing 10. Here, the developing roller 30 mounted on the opening 14 in the casing 10 may be the developing roller 30 removed in step C9, or may be a new developing roller 30.

Next, the operator mounts the developing roller bearing 40 on the casing 10 (step C11, a developing roller bearing mounting step). Specifically, the operator fixes the developing roller bearing 40 to the first outer surface 11 of the casing 10 using the bolt. Here, the developing roller bearing 40 mounted on the first outer surface 11 of the casing 10 may be the developing roller bearing 40 removed in step C8, or may be a new developing roller bearing 40.

Next, the operator mounts the gear portion 70 on the casing 10 (step C12, a gear portion mounting step). Specifically, the operator first mounts the plurality of gears and the coupling 72 on the second outer surface 12 of the casing 10. Next, the operator mounts the gear cover 71 on the second outer surface 12 of the casing 10. Subsequently, the operator fixes the gear cover 71 to the casing 10 using the bolt.

Here, the gears, the coupling 72, and the gear cover 71 mounted on the second outer surface 12 of the casing 10 may be the gears, the coupling 72, and the gear cover 71 removed in step C7, or may be new gears, a new coupling 72, and a new gear cover 71.

Next, the operator mounts the second lever 80 on the casing 10 (step C13, a second lever mounting step). Specifically, the operator mounts the second lever 80 on the outer surface of the gear cover 71. The operator then mounts the second lever 80 on the other end portion in the first direction of the developing roller shaft 32. Here, the second lever 80 mounted on the developing roller shaft 32 may be the second lever 80 removed in step C6, or may be a new second lever 80.

Next, the operator mounts the memory assembly 90 on the casing 10 (step C14, a memory assembly mounting step). Specifically, the operator mounts the holder 92 on the outer surface of the gear cover 71. The operator also mounts the holder cover 93 on the outer surface of the gear cover 71. The operator then fixes the holder cover 93 to the gear cover 71 with the bolt.

Here, the memory 91, the holder 92, and the holder cover 93 mounted on the outer surface of the gear cover 71 may be the memory 91, the holder 92, and the holder cover 93 removed in step C5, or may be a new memory 91, a new holder 92, and a new holder cover 93.

Next, the operator fills the casing 10 with new developer (step C15, a filling step). Specifically, the operator supplies developer into the accommodation chamber 13 of the casing 10 through the filling port 15.

Next, the operator mounts the cap 16 on the casing 10 (step C16, a cap mounting step). Therefore, the filling port 15 is closed. Here, the cap 16 mounted on the casing 10 may be the cap 16 removed in step C3, or may be a new cap 16.

Next, the operator mounts the first lever 50 on the casing 10 (step C17, a lever mounting step). Specifically, the operator mounts the first lever 50 on the first outer surface 11 of the casing 10. Here, the first lever 50 mounted on the first outer surface 11 of the casing 10 may be the first lever 50 removed in step C2, or may be a new first lever 50.

Next, the operator mounts the jig 900 on the casing 10 and the first lever 50 (step C18, a jig mounting step). As a result, the developing cartridge 1 becomes the state illustrated in FIGS. 11 and 12.

As illustrated in FIGS. 11 and 12, in step C18, the bearing protrusion 42 of the developing roller bearing 40 is inserted in the bearing groove 901 of the jig 900. As a result, the jig 900 is mounted on the casing 10 and the developing roller bearing 40. Further, as illustrated in FIGS. 11 and 12, in step C18, the lever protrusion 53 of the first lever 50 is inserted in the lever hole 902 of the jig 900. Consequently, the first lever 50 is mounted on the jig 900. As a result, movement of the first lever 50 relative to the casing 10 is restricted. In other words, the first lever 50 is held on the casing 10 through the jig 900.

As illustrated in FIGS. 11 and 12, in step C18, the press-fitting protrusion 903 contacts the bearing protrusion 42. Accordingly, the bearing protrusion 42 is press-fitted into the bearing groove 901. As a result, the jig 900 is fixed relative to the casing 10 and the developing roller bearing 40. Also, in step C18, the lever protrusion 53 is press-fitted into the lever hole 902. Therefore, the first lever 50 is fixed relative to the jig 900. Further, the pivotal movement of the first lever 50 relative to the jig 900 about the lever protrusion 53 is restrained.

Further, when the first lever 50 pivotally moves about the lever protrusion 53 in a state where the jig 900 is mounted on both the casing 10 and the first lever 50, the first lever 50 contacts the jig contact surface 904 or the casing contact surface 111 of the casing 10. In this way, the range of the pivotal movement of the first lever 50 relative to the jig 900 is limited.

Next, the operator mounts the lever cover 60 on the casing 10 (step C19, a cover mounting step). Through this step, the developing cartridge 1 becomes the state illustrated in FIGS. 9 and 10. Here, the lever cover 60 mounted on the casing 10 may be the lever cover 60 removed in step C1, or may be a new lever cover 60.

Specifically, the operator fixes the lever cover 60 to the first outer surface 11 of the casing 10 with the bolt. Accordingly, the cap 16 mounted on the filling port 15 is covered by the lever cover 60. At this time, the first lever 50 is held on the casing 10 through the jig 900. Therefore, the operator can perform the operation of mounting the lever cover 60 while the first lever 50 is held on the first outer surface 11 of the casing 10.

In step C19, the operator moves the lever cover 60 toward the first outer surface 11 of the casing 10 while the lever cover 60 is in contact with the guide surface 905. In this way, the guide surface 905 guides the lever cover 60, thereby enabling the lever cover 60 to be easily positioned relative to the casing 10. Accordingly, the operation of mounting the lever cover 60 on the casing 10 can be performed simply.

Subsequently, the operator removes the jig 900 from the casing 10 and the first lever 50 (step C20, a jig removing step). Specifically, the lever protrusion 53 of the first lever 50 is extracted from the lever hole 902 in the jig 900. Also, the bearing protrusion 42 of the developing roller bearing 40 is extracted from the bearing groove 901 in the jig 900. As a result, the jig 900 is removed from the casing 10 and the first lever 50.

3. Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The developing cartridge 1 may be attached to a drum cartridge including a single photosensitive drum, or to a drum cartridge including a plurality of photosensitive drums. Alternatively, the developing cartridge 1 may be attached to an image forming apparatus directly.

What is claimed is:

1. A recycling method of recycling a developing cartridge attachable to and detachable from a drum cartridge comprising a photosensitive drum, the developing cartridge comprising:

a developing roller rotatable about a first axis extending in a first direction;

a housing configured to accommodate developer therein, the housing having a filling port positioned at one end portion in the first direction of the housing;

a lever positioned at the one end portion in the first direction of the housing, wherein, in a state where the developing cartridge is attached to the drum cartridge, the lever is pivotally movable relative to the housing about a second axis extending in the first direction between:

a first position in which the lever causes the developing roller to contact the photosensitive drum; and a second position in which the lever causes the developing roller to separate from the photosensitive drum; and a lever cover positioned at the one end portion in the first direction of the housing, the lever cover covering a part of the lever and at least a part of the filling port, the recycling method comprising:

a jig mounting step of mounting a jig on both the housing and the lever to restrict movement of the lever relative to the housing;

a cover removing step of removing the lever cover from the housing;

a filling step of filling the housing with developer through the filling port after the cover removing step;

a cover mounting step of mounting the lever cover on the housing after the filling step; and a jig removing step of removing the jig from the housing and the lever after the cover mounting step, wherein the jig mounting step is performed before the cover mounting step at the latest.

2. The recycling method according to claim 1, wherein the jig mounting step is performed before the cover removing step.

3. The recycling method according to claim 1, wherein the housing further has:

a developing roller bearing positioned at the one end portion in the first direction of the housing, the developing roller bearing supporting the developing roller so that the developing roller is rotatable, and wherein, in the jig mounting step, the jig is mounted on the developing roller bearing.

4. The recycling method according to claim 3, wherein the developing roller bearing includes:

a bearing protrusion protruding in the first direction, wherein the jig has:

a bearing groove into which the bearing protrusion can be inserted, and wherein, in the jig mounting step, the bearing protrusion is inserted into the bearing groove.

5. The recycling method according to claim 4, wherein the lever includes:

a lever protrusion protruding in the first direction, wherein the jig has:

a lever hole into which the lever protrusion can be inserted, and wherein, in the jig mounting step, the lever protrusion is inserted into the lever hole.

6. The recycling method according to claim 5, wherein, in the jig mounting step, the lever protrusion is press-fitted into the lever hole.

7. The recycling method according to claim 1, wherein the housing has:

a casing contacting surface configured to contact the lever in a state where the jig is mounted on both the housing and the lever.

8. The recycling method according to claim 1, wherein the jig has:

a jig contacting surface configured to contact the lever in a state where the jig is mounted on both the housing and the lever.

9. The recycling method according to claim 1, wherein the jig has:

a guide surface that guides the lever cover while the lever cover is being mounted on the housing in the cover mounting step.

10. The recycling method according to claim 1, further comprising:

a lever removing step of removing the lever from the housing after the cover removing step and before the filling step; and a lever mounting step of mounting the lever on the housing after the filling step and before the cover mounting step, wherein the jig mounting step is performed after the lever mounting step and before the cover mounting step.

11. The recycling method according to claim 1, wherein the housing further has a cap configured to cover the filling port, the recycling method further comprising:

a cap removing step of removing the cap from the housing after the cover removing step and before the filling step; and a cap mounting step of mounting the cap on the housing after the filling step and before the cover mounting step.

* * * * *